(12) United States Patent
Strassman

(10) Patent No.: US 8,201,653 B2
(45) Date of Patent: Jun. 19, 2012

(54) SEATS FOR SELF-BALANCING VEHICLES

(76) Inventor: David R. Strassman, Madison, WI (US)

( * ) Notice: Subject to any disclaimer, the term of this patent is extended or adjusted under 35 U.S.C. 154(b) by 432 days.

(21) Appl. No.: 12/575,914

(22) Filed: Oct. 8, 2009

(65) Prior Publication Data

US 2010/0117426 A1 May 13, 2010

Related U.S. Application Data

(60) Provisional application No. 61/103,745, filed on Oct. 8, 2008.

(51) Int. Cl.
*B62K 61/00* (2006.01)
(52) U.S. Cl. ............................ 180/218; 180/273; 180/7.1
(58) Field of Classification Search .................. 297/335, 297/452.1, 195.11; 180/218, 273.1, 65.51, 180/21, 7.1
See application file for complete search history.

(56) References Cited

U.S. PATENT DOCUMENTS

| | | | |
|---|---|---|---|
| 5,971,091 A | 10/1999 | Kamen et al. | |
| 6,561,294 B1 | 5/2003 | Kamen et al. | |
| 7,004,271 B1 | 2/2006 | Kamen et al. | |
| 7,273,116 B2 | 9/2007 | Kamen et al. | |
| 7,866,429 B2 * | 1/2011 | Ishii et al. | 180/218 |
| 2006/0086544 A1 * | 4/2006 | Kamen et al. | 180/21 |
| 2008/0035395 A1 | 2/2008 | Kamen et al. | |

* cited by examiner

*Primary Examiner* — Tony Winner
(74) *Attorney, Agent, or Firm* — Joseph T. Leone, Esq.; DeWitt Ross & Stevens S.C.

(57) ABSTRACT

A support for a self-balancing vehicle that allows users to operate the vehicle while standing or sitting. The support includes one or more sitting platforms connected to the vehicle. The sitting platforms are rotationally movable between standing and sitting positions. The sitting platforms are connected to the vehicle by support bars that run vertically from the sitting platforms to the body of the vehicle. Displaceable rods moveably attached to the support bars contact the underside of the sitting platforms when in the sitting position and extend past the support bars to the standing platform to activate the vehicle. A plate system interposed between where the displaceable rods extend from the support bars and the standing platform help to evenly distribute pressure exerted by the support bars on the standing platform.

15 Claims, 6 Drawing Sheets

SEATS FOR SELF-BALANCING VEHICLES

CROSS-REFERENCE TO RELATED APPLICATIONS

Priority is hereby claimed to provisional application Ser. No. 61/103,745, filed Oct. 8, 2008, which is incorporated herein.

FIELD OF THE INVENTION

The present invention relates to supports for self-balancing vehicles that allow users to operate the vehicles while standing or sitting.

BACKGROUND OF THE INVENTION

Personal, self-balancing vehicles, such as the "SEGWAY"-brand Human Transporter, have emerged as a new method of transportation. In existing systems, such as the self-balancing vehicles shown in U.S. Pat. No. 5,971,091, the personal vehicles are self-propelled and user-guidable. No more than two wheels support the vehicle and do so only along the lateral plane. The vehicles therefore require dynamic stabilization in the fore-aft plane.

The stabilization of the self-balancing vehicles in the fore-aft plane is coupled to translational movement of the vehicles. The translational movement is designed to mirror the process of human walking. For example, if a user standing on a platform of an initially balanced vehicle leans forward, thereby offsetting the balance, the vehicle moves forward to regain balance just as in walking a leg moves forward to regain balance. The vehicles balance in the fore-aft plane with the help of software-running computers, tilt sensors, and gyroscopes. Gyroscopic sensors are used to detect fore and aft tilting of the platform on the device which indicates a departure from stabilization in the fore-aft plane. Servo drive motors rotate the wheels forward or backward as needed for balance and propulsion. In this manner, the user accelerates or decelerates by leaning forward or backward in the direction the user wishes to travel. By leaning left or right, or using of a "lean steer" handlebar, or by using other directional devices such as a rotating handle, enables turning the vehicle left or right via differential rotation of one wheel with respect to the other.

Many self-balancing vehicles are driven by electric motors at up to 5.6 m/s (12.5 mph, 20 km/h) and can travel as far as 24 miles on a single battery charge. This enables the vehicles to cover distances typically limited to bicycles or cars. However, their small size enables the vehicles to transport users in many places that a car or bicycle cannot, including inside buildings, elevators, trains, and the like.

The self-balancing vehicles typically contain a standing platform. The standing platform serves as the means of supporting the user on the vehicle and defines a point of balance along the fore-aft plane. The platforms typically have a weight-sensitive sensor to indicate to the computer when a rider has fully mounted the vehicle. This prevents unexpected movement of the vehicle before and during engaging the vehicle.

The fact that such personal vehicles, e.g., the "SEGWAY"-brand Human Transporter, consists only of a standing platform requires that a user must be able to stand to use them. Were it not for this characteristic, these vehicles would serve as a valuable tool to provide mobility for individuals with lower-limb disabilities. In contrast, U.S. Pat. No. 6,561,294 and related patents and applications (U.S. Pat. Nos. 7,004, 271, 7,273,116, and U.S. application Ser. No. 11/852,767) describe self-balancing vehicles with seats. The seats allow users to operate the vehicles while seated. These seats are either permanently attached to the vehicles or are removable. However, in either case, the seats prohibit easy operation of the vehicles in both standing and sitting positions while the seat is attached to the vehicles.

Thus, the foregoing described systems provide options for users to operate self-balancing vehicles while either standing or sitting but not both. However, none of the systems describe supports for self-balancing vehicles that allow operation of the vehicle from both standing and sitting positions while the support remains attached to the vehicle. Such a device would be useful for users who have the ability to stand for only limited periods of time. Thus, a long-felt need exists for supports for self-balancing vehicles that allow operation of the vehicle from both standing and sitting positions while the support is attached to the vehicle, and without any modifications to alternate between seated riding and standing riding.

SUMMARY OF THE INVENTION

The need for supports for self-balancing vehicles that enable users to operate the vehicles from either sitting or standing positions has been met with the present invention. The invention embodies many forms. However, an exemplary version of the invention is described as follows.

The support includes one or more sitting platforms connected to the vehicle such that the sitting platforms position the user in a seated position over the center of gravity of the vehicle. The preferred embodiment includes two sitting platforms.

The sitting platforms are configured so that they are rotationally movable and can be in one of at least two positions, a standing position or a sitting position. In the standing position, the sitting platforms are oriented away from the center of the standing platform, which permits the user to stand while operating the vehicle. In the sitting position, the sitting platforms are oriented toward the center of the vehicle, which permits the user to sit while operating the vehicle.

The sitting platforms can be connected to the vehicle by support bars that run vertically from the sitting platforms to the body of the vehicle near a standing platform. The sitting platforms can be attached to the support bars by a hinge or other device that allows the sitting platform to rotate between the standing and sitting positions.

The vehicle to which the support is secured can contain a standing platform that is sensitive to pressure. Such a standing platform would prevent translational movement in the absence of pressure, as when no user is standing on it. By contrast, the weight of a user standing on the platform would apply a pressure on the platform and trigger the vehicle in an active mode.

To enable a user to operate a vehicle with a pressure-sensitive standing platform while seated, the sitting platforms can be configured so that a pressure applied to the sitting platform by a seated user is transmitted to the pressure-sensitive standing platform via a pressure transmitter. The pressure transmitter can include a displaceable rod moveably engaged with the support bar. The displaceable rod may extend both above and below the support bar to form an upper extension and a lower extension, respectively. The upper extension of the displaceable rod may contact the sitting platform when the sitting platform is in the sitting position, and the lower extension of the displaceable rod may contact the standing platform on the self-balancing vehicle. The pressure transmitter can also include a plate system interposed between the lower extension of the displaceable rod and the standing platform to evenly distribute the pressure exerted by the bar on the standing platform.

The objects and advantages of the invention will appear more fully from the following detailed description of the preferred embodiment made in conjunction with the accompanying drawings.

DETAILED DESCRIPTION OF THE INVENTION

Figure 1A:
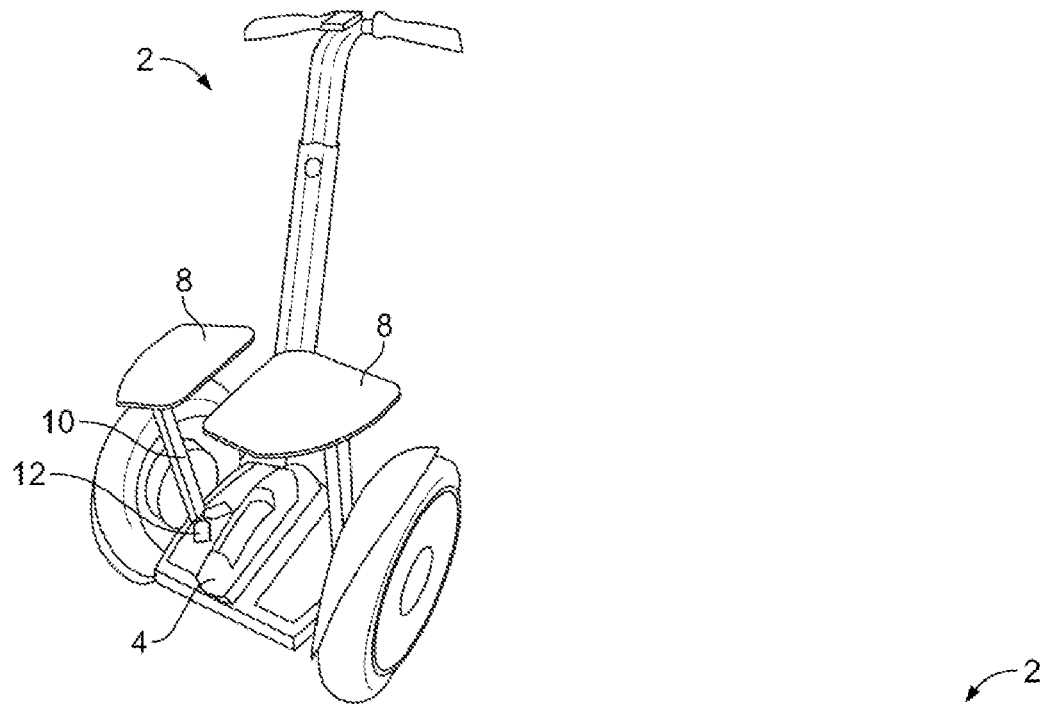
FIG. 1A: Rear view of a self-balancing vehicle with a first version of the inventive seat in place. The sitting platforms are in the sitting position.

Self-balancing vehicles with supports according to various version of the present invention will be described with reference to the accompanying attachments. The same reference numerals are used throughout all of the drawings to designate the same elements.

Figure 1B:
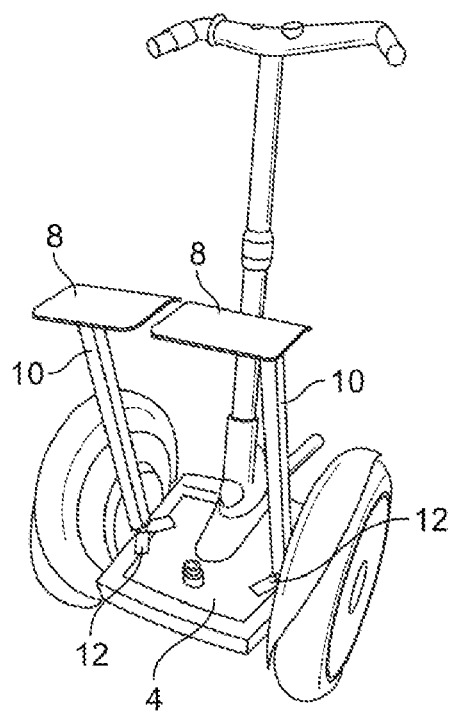
FIG. 1B: Rear view of a self-balancing vehicle with a second version of the inventive seat in place. The sitting platforms are in the sitting position.
Figure 2A:
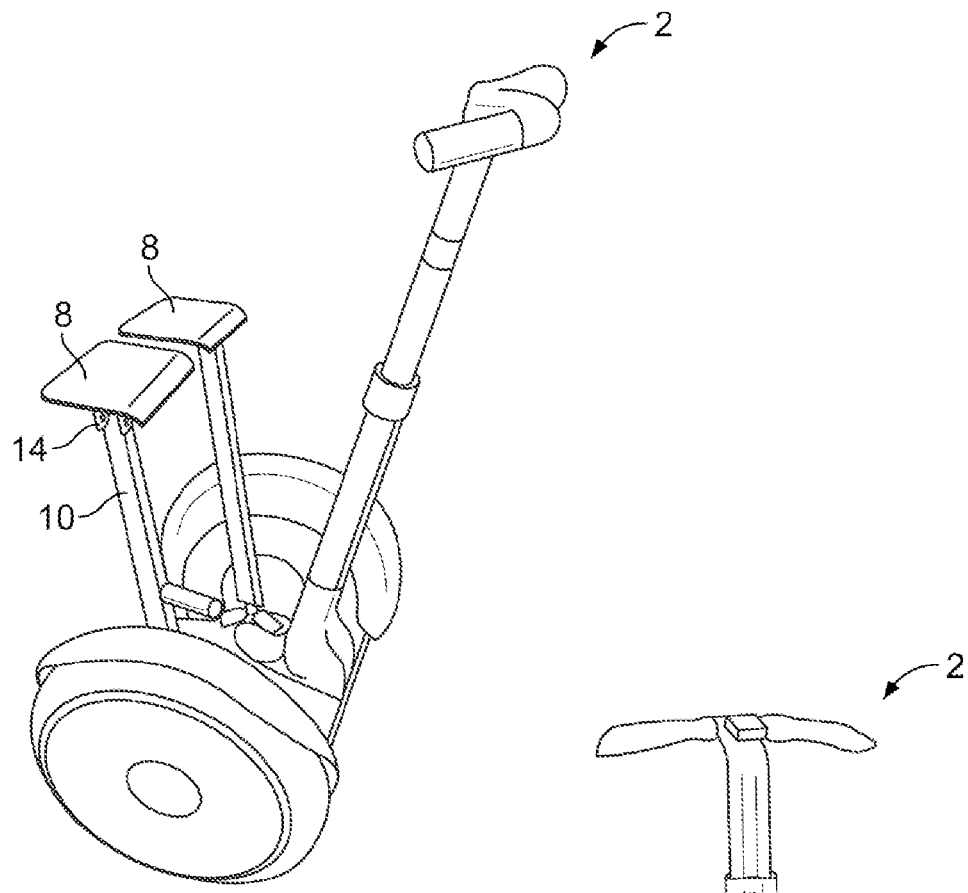
FIG. 2A: Side view of the second version of the inventive seat.
Figure 2B:
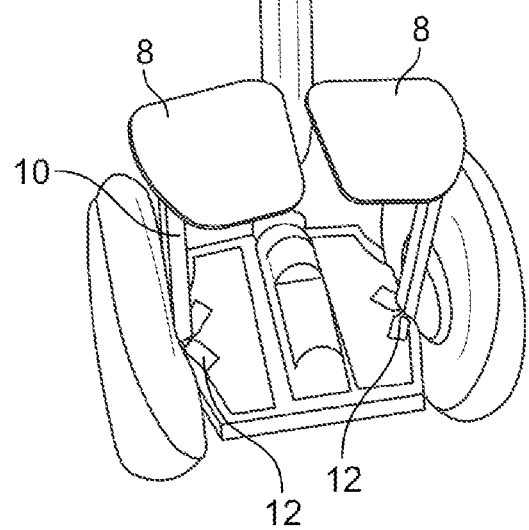
FIG. 2B: Side view of the first version of the inventive seat.

FIGS. 1A, 1B, 2A, and 2B show views of self-balancing vehicles 2 containing supports 10 with sitting platforms 8 in the sitting position. Two versions of the inventive seat are shown. A first version is shown in FIGS. 1A and 2B. In the first version, the supports 10 are relatively short, and the sitting platforms 8 are relatively large in area. The first version of the seat is designed so that when used sitting, the user is in a full, seated position, with knees bent approximately 90 degrees. When the first version is used standing, the sitting platforms 8 are swung up and out of the way of the user's legs. (See below for a further discussion.) A second version of the inventive seat is shown in FIGS. 1B and 2A. In the second version, the supports 10 are relatively long and tilted slightly rearward, as best seen in FIG. 2A. The sitting platforms 8 in the second version of the seat are smaller in area than in the first version. The second version of the seat is designed so that when used sitting, the user is more upright, with the user only leaning against the sitting platforms 8 or seated upon the platforms 8 with only a slight bend to the user's knees. When the second version is used standing, the sitting platforms 8 can remain in place or be swung up and out of the way of the user's legs. In both the first and second versions of the seat illustrated here, the supports 10 include two sitting platforms 8 connected to a self-balancing vehicle 2. It is envisioned that the supports 10 may interface with any number of sitting platforms 8, whether one, two, or more than two, so long as the sitting platform(s) 8 is (are) able to position the user 20 over the center of gravity of the self-balancing vehicle 2.

The sitting platforms 8 can be any shape. Shown in FIGS. 1B and 2A are roughly planar sitting platforms 8 that are roughly rectangular with a downward curving forward edge. FIGS. 1A and 2B exemplify more softly curved shapes for the sitting platforms 8. The sitting platforms 8 can be any shape as long as they sufficiently support the user 20 in a seated position. If two sitting platforms are present, they need not be mirror images of one another.

The sitting platforms 8 are connected to the self-balancing vehicle 2 by support bars 10 that run substantially vertically (or at an angle generally less than 45° from normal) from the sitting platforms 8 to the self-balancing vehicle 2. However, other means of connecting the sitting platforms 8 to the self-balancing vehicle 2, such as side rails or chariot-like walls, are contemplated. The support bars 10 can be of different lengths from vehicle to vehicle to accommodate users' different sizes, needs, disabilities, or comfort preferences. The supports 10 are preferably attached to the vehicle 2 at the periphery of the standing platform 4, but attachments to other parts of the vehicle 2 are within the scope of the invention.

Figure 3A:
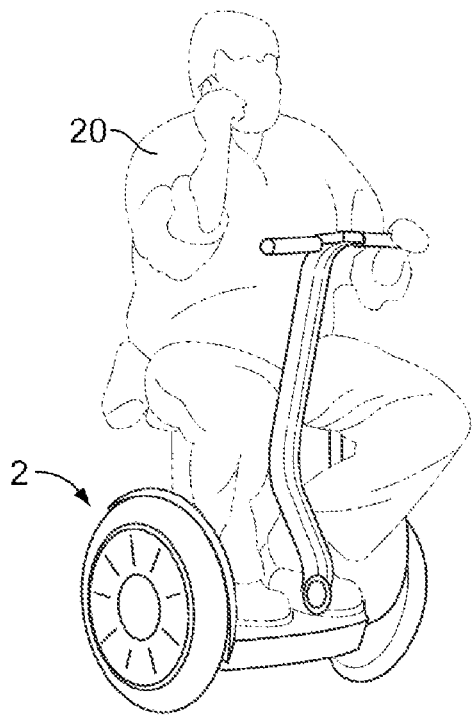
FIG. 3A: Front view of a user operating a self-balancing vehicle while seated upon the first version of the inventive seat.
Figure 3B:
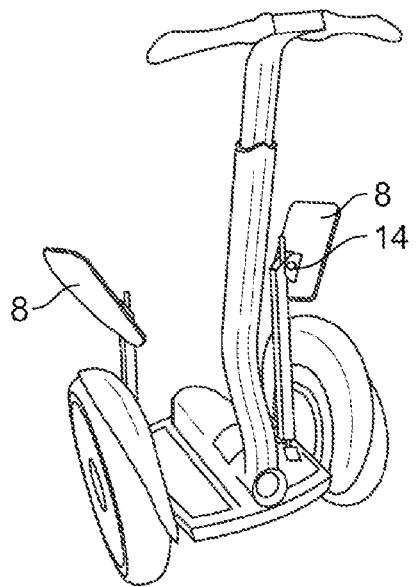
FIG. 3B: Front view of a self-balancing vehicle with the first version of the inventive seat in place. The sitting platforms are in the standing position.
Figure 3C:
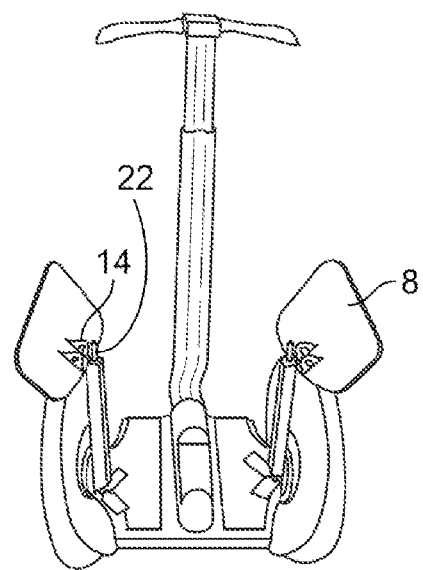
FIG. 3C: Rear view of a self-balancing vehicle with the first version of the inventive seat in place. The sitting platforms are in the standing position.

FIGS. 3A, 3B, and 3C illustrate how the first version of the invention is used in the sitting position and in the standing position. FIG. 3A shows a user 20 seated upon the self-supporting vehicle using the inventive seat (generally hidden from view by the user's body). As shown in FIGS. 3B and 3C, the sitting platforms 8 are attached to the supports 10 by hinges 14 or any other device that allows the sitting platforms 8 to rotate between the sitting and standing positions. The hinges 14 allow the sitting platforms 8 to rotate vertically in an upward direction, as shown, or horizontally, such that the sitting platforms 8 rotate toward either the back or the front of the vehicle. It is also envisioned that the sitting platforms 8 may be configured to rotate vertically in a downward direction. In such a case, a locking mechanism may support the sitting platforms 8 in the sitting position. Regardless of the rotational direction of the sitting platforms 8, the hinges 14 are preferably spring-loaded or include a detente for default positioning in either the standing or sitting position. Alternatively, they may be freely movable between the seated and standing positions. In this fashion, the sitting platforms 8 are easily moved out of the way so that a user may easily mount the vehicle. If the user intends to ride standing, the platforms are left in the position shown in FIGS. 3B and 3C. If the user intends to ride sitting, the platforms are lowered into the sitting position and the user then sits down to ride, as shown in FIG. 3A.

In the standing position, the sitting platforms 8 may be approximately perpendicular to the standing platform 4. Alternatively, they may be oriented away from the center of the standing platform 4 at any angle relative to the standing platform 4 insofar as the orientation allows sufficient room for the user 20 to stand on the standing platform 4.

Figure 4:
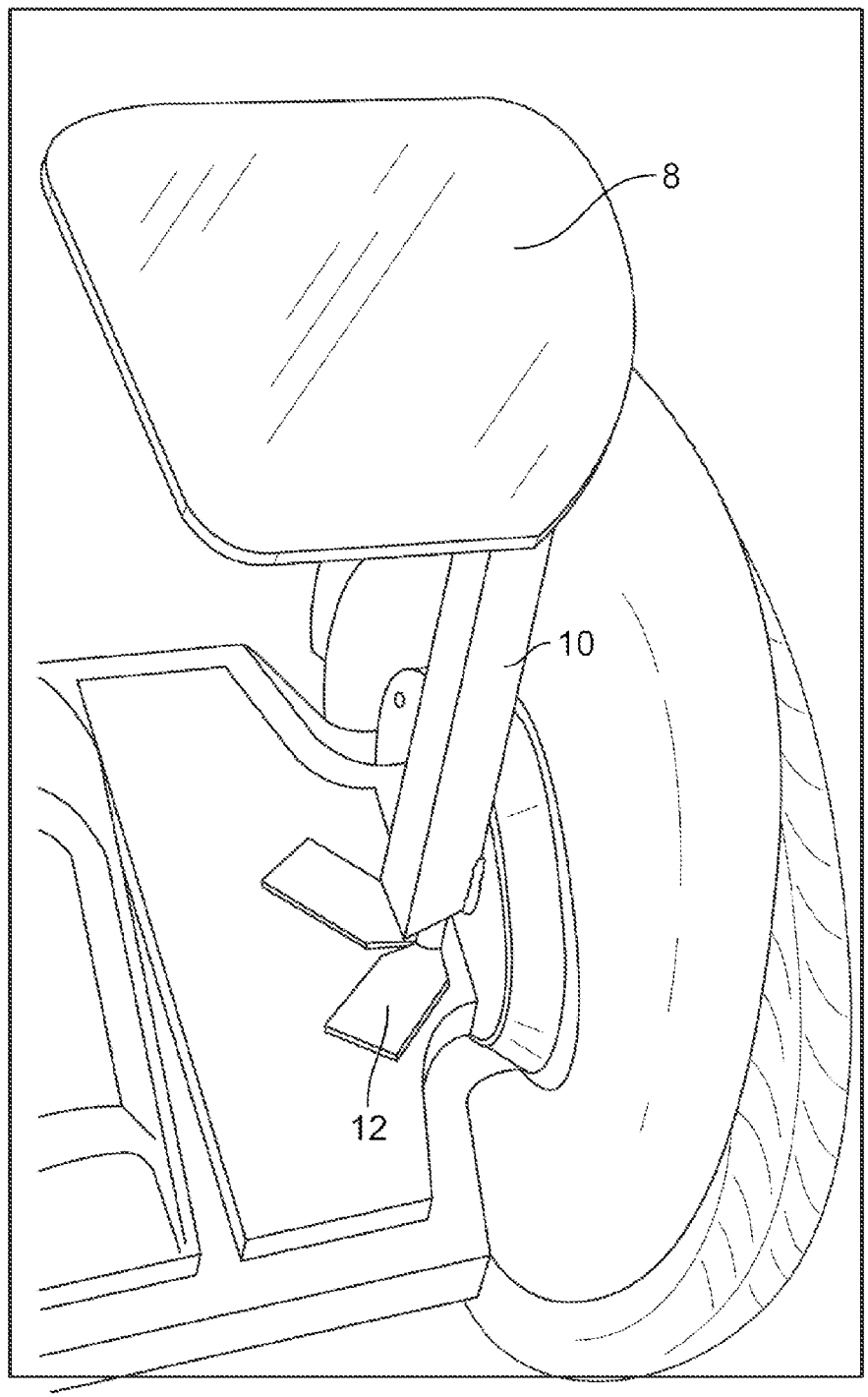
FIG. 4: Close-up view of sitting platform 8, support 10, and plate system 12 for transmitting the user's seated movements to the standing platform.
Figure 5:
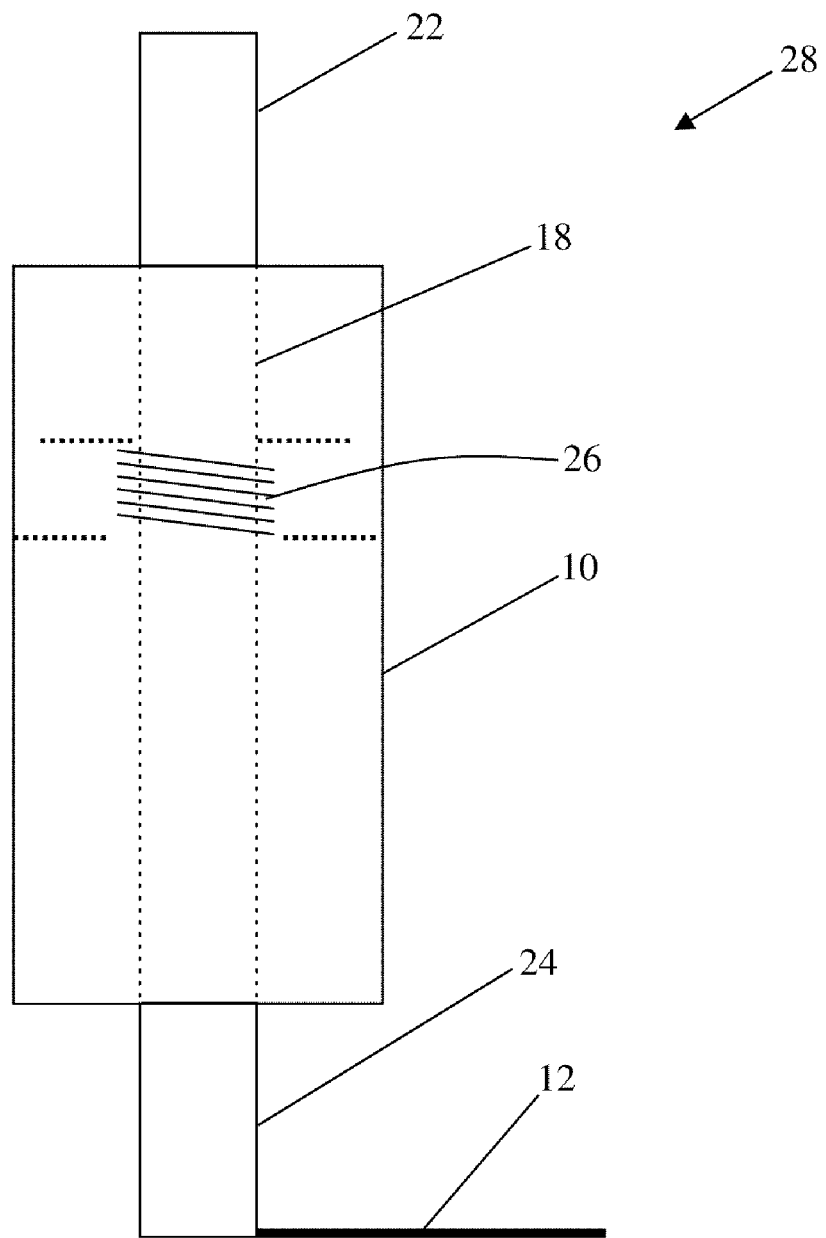
FIG. 5: Schematic rendering of a pressure transmitter.

FIG. 4 is a close up view of the seat, showing sitting platform 8 in the sitting position and highlights the support 10 and plate system 12. Inside the support 10 is a pressure transmitter 28, which is shown schematically in FIG. 5. The pressure transmitter is configured to transmit the user's seated weight to the sensors in the floor 4 of the vehicle. As shown in FIG. 5, the pressure transmitter 28 is a straightforward arrangement of a displaceable rod 18 which internally spans the length of the support bar 10 and is moveable therein. (The displaceable rod 18 may be moveably disposed on the exterior of the support bar 10.) The displaceable rod 18 extends slightly past the top of the support bar 10 to create an upper extension 22 of the displaceable rod 18. See also FIG. 3C, which shows the upper extension 22 protruding from the left support. The upper extension 22 is positioned so that it contacts the sitting platform 8 when the sitting platform 8 is in the sitting position. When the sitting platform 8 is in the sitting position, the displaceable rod 18 extends past the bottom of the support bar 10 beneath the point on which the support bar 10 is attached to the self-balancing vehicle 2 to create a lower extension 24 of the displaceable rod 18. A spring 26 biases the rod 18 upward. In this fashion, when the sitting platforms 8 are placed in the sitting position, they contact extension upper extension 22. When the user places his weight upon the sitting platforms 8, the extension 22 and rod 18 are pushed downward so that the lower extension 24 makes firm contact with the plate system 12 and floor 4 of the vehicle. This functions to alert the vehicle 2 that a rider is on board, fully seated, and ready to navigate. When the sitting platforms are withdrawn to the standing position, the spring 26 biases the rod 18 upward, thereby releasing contact between lower extension 24 the plate system 12.

The plate system 12 is optional. When present it is affixed to lower ends of the supports 10 and contacts the standing platform 4 of the vehicle 2. It is a fork-like structure, dimensioned and configured to spread out a seated user's weight over a greater area of the standing platform 4. This makes the vehicle more responsive to navigation movements made by the user when the user is seated.

Figure 6:
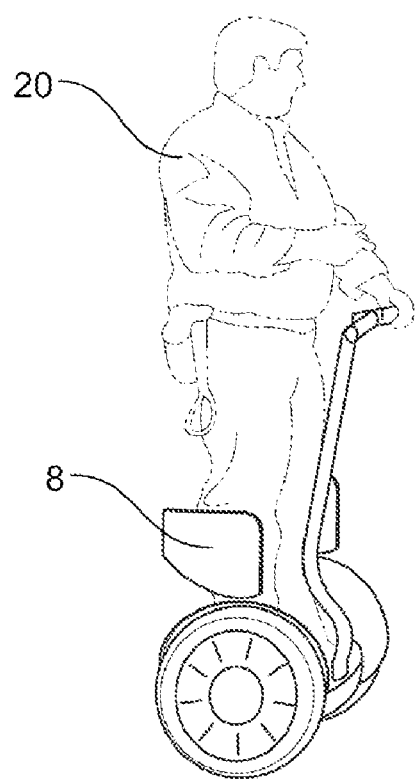
FIG. 6: View of a user operating a self-balancing vehicle, while standing, with the first version of the inventive seat in place. The sitting platforms are in the standing position.
Figure 7:
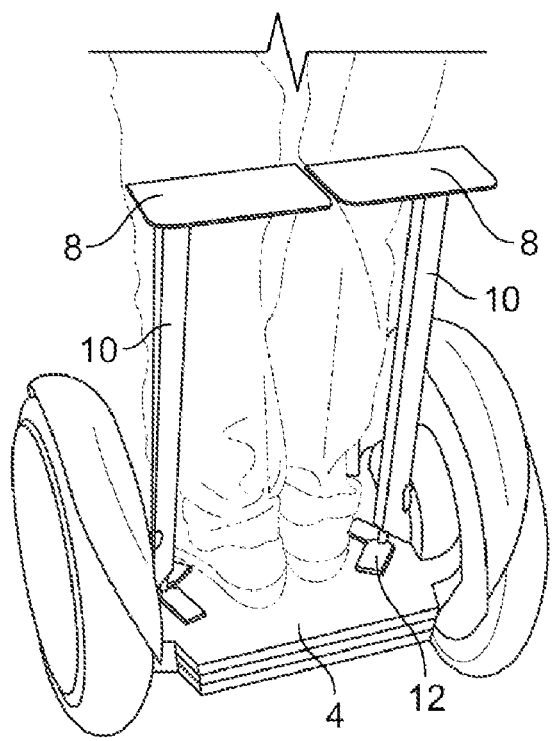
FIG. 7: View of a user operating a self-balancing vehicle, while standing, with the second version of the inventive seat in place. The sitting platforms remain in the sitting position.

FIGS. 6 and 7 depict the use of the first version and second version of the invention when the user is standing (respectively). As shown in FIG. 6 (which depicts the first version of the invention), the user 20 simply flips the sitting platforms up and out of the way and rides the vehicle in conventional fashion. As shown in FIG. 7 (which depicts the second version of the invention), the user stands with the sitting platforms 20 in place, with the back of the user's legs contacting the sitting platforms 8.

It is understood that the invention is not confined to the particular construction and arrangement of parts herein illustrated and described, but embraces such modified forms thereof as come within the scope of the following claims.

What is claimed is:

1. A device for supporting a user on a two-wheeled, self-balancing vehicle having a horizontally-oriented standing platform, the device comprising:
    at least one support connected to the standing platform of the self-balancing vehicle, wherein the at least one support includes a first support and a second support; and
    at least one sitting platform attached to each support, wherein the at least one sitting platform includes corresponding first and second sitting platforms attached to their respective supports, wherein each sitting platform is rotationally connected to its corresponding support such that each sitting platform is movable between a sitting position and a standing position,
    wherein the at least one support and the at least one sitting platform are dimensioned and configured to position the user over a center of gravity of the self-balancing vehicle when the user is seated upon the sitting platform.

2. The device of claim 1, wherein the at least one support and the at least one sitting platform are dimensioned and configured to permit the user to operate the self-balancing vehicle while standing or sitting while the at least one support remains connected to the standing platform of the self-balancing vehicle.

3. The device of claim 1, further comprising a first plate system disposed between the first support and the first standing platform, and a second plate system disposed between the second support and the second standing platform.

4. The device of claim 1, further comprising a corresponding first and second hinge, wherein the first hinge rotationally connects the first sitting platform to the first support, and the second hinge rotationally connects the second sitting platform to the second support.

5. The device of claim 1, further comprising at least one pressure transmitter operationally disposed between the first sitting platform and the first support, or between the second sitting platform and the second support, wherein the pressure transmitter is dimensioned and configured to exert pressure on the standing platform of the self-balancing vehicle when its corresponding sitting platform is in the sitting position.

6. The device of claim 5, wherein the pressure transmitter comprises a displaceable rod disposed within the first or second support and having an upper extension and a lower extension; and
    wherein when the corresponding sitting platform is in the sitting position, the upper extension contacts the sitting platform and a lower extension contacts, and exerts pressure on, the standing platform of the self-balancing vehicle.

7. The device of claim 6, further comprising a spring operationally connected to the displaceable rod, wherein the spring is dimensioned and configured to bias the displaceable rod toward the sitting platform.

8. The device of claim 1, further comprising corresponding first and second pressure transmitters, wherein the first pressure transmitter is operationally disposed between the first sitting platform and the first support, and the second pressure transmitter is operationally disposed between the second sitting platform and the second support, and wherein the pressure transmitters are dimensioned and configured to exert pressure on the standing platform of the self-balancing vehicle when the sitting platforms are in the sitting position.

9. The device of claim 8, wherein the pressure transmitters comprise a displaceable rod disposed within the first and second supports, each rod having an upper extension and a lower extension; and
    wherein when the corresponding sitting platform is in the sitting position, the upper extension contacts the sitting platform and a lower extension contacts, and exerts pressure on, the standing platform of the self-balancing vehicle.

10. The device of claim 9, further comprising a spring operationally connected to each displaceable rod, wherein the springs are dimensioned and configured to bias the displaceable rods toward their corresponding sitting platforms.

11. A device for supporting a user on a two-wheeled, self-balancing vehicle having a horizontally-oriented standing platform, the device comprising:
    a first and second support connected to the standing platform of the self-balancing vehicle;
    corresponding first and second sitting platforms attached to the first and second supports; wherein each sitting platform is rotationally connected to its corresponding support by a corresponding hinge such that each sitting platform is movable between a sitting position and a standing position;
    wherein the support and sitting platform are dimensioned and configured to position the user over a center of gravity of the self-balancing vehicle when the user is seated upon the sitting platform.

12. The device of claim 11, wherein the support and sitting platform are dimensioned and configured to permit the user to operate the self- balancing vehicle while standing or sitting while the support remains connected to the standing platform of the self-balancing vehicle.

13. The device of claim 12, further comprising corresponding first and second pressure transmitters, wherein the first pressure transmitter is operationally disposed between the first sitting platform and the first support, and the second pressure transmitter is operationally disposed between the second sitting platform and the second support, and wherein the pressure transmitters are dimensioned and configured to exert pressure on the standing platform of the self-balancing vehicle when the sitting platforms are in the sitting position.

14. The device of claim 13, wherein the pressure transmitters comprise a displaceable rod disposed within the first and second supports, each rod having an upper extension and a lower extension; and wherein when the corresponding sitting platform is in the sitting position, the upper extension contacts the sitting platform and a lower extension contacts, and exerts pressure on, the standing platform of the self-balancing vehicle.

15. The device of claim 14, further comprising a spring operationally connected to each displaceable rod, wherein the springs are dimensioned and configured to bias the displaceable rods toward their corresponding sitting platforms.

* * * * *